United States Patent
Wiederin et al.

(10) Patent No.: US 12,040,172 B1
(45) Date of Patent: Jul. 16, 2024

(54) METHOD FOR ICPMS INSTRUMENT STABILITY CONTROL WITH STRONG ACID RESISTANT SPRAY CHAMBER

(71) Applicant: Elemental Scientific, Inc., Omaha, NE (US)

(72) Inventors: Kevin Wiederin, Omaha, NE (US); Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 98 days.

(21) Appl. No.: 17/729,497

(22) Filed: Apr. 26, 2022

Related U.S. Application Data

(60) Provisional application No. 63/179,772, filed on Apr. 26, 2021.

(51) Int. Cl.
*H01J 49/00* (2006.01)
*G01N 21/71* (2006.01)
*G01N 21/73* (2006.01)
*H01J 49/04* (2006.01)
*H01J 49/10* (2006.01)

(52) U.S. Cl.
CPC .......... *H01J 49/105* (2013.01); *G01N 21/714* (2013.01); *G01N 21/73* (2013.01); *H01J 49/0422* (2013.01)

(58) Field of Classification Search
CPC .. H01J 49/105; H01J 49/0422; G01N 21/714; G01N 21/73

USPC .......................................... 250/281, 282, 288
See application file for complete search history.

(56) References Cited

U.S. PATENT DOCUMENTS

| | | | | |
|---|---|---|---|---|
| 5,454,274 A * | 10/1995 | Zhu | ......................... | H01J 49/04 250/288 |
| 6,864,974 B1 * | 3/2005 | Wiederin | .............. | H01J 49/105 250/288 |
| 10,497,550 B1 * | 12/2019 | Field | .................... | H01J 49/0422 |
| 2018/0024068 A1 * | 1/2018 | Kawabata | .............. | G01N 27/62 250/281 |
| 2021/0005440 A1 * | 1/2021 | Araki | .................... | H01J 49/105 |

* cited by examiner

*Primary Examiner* — Michael Maskell
(74) *Attorney, Agent, or Firm* — Kevin E. West; Advent, LLP

(57) ABSTRACT

Stabilization of an inductively coupled plasma mass spectrometer during analysis of semiconductor-grade chemical samples is described. A method embodiment includes, but is not limited to, transferring an aerosolized sample of a semiconductor-grade chemical into a hydrofluoric-acid resistant spray chamber; passing at least a portion of the aerosolized sample through an outlet tube of the hydrofluoric-acid resistant spray chamber; and introducing an impingement gas into the outlet tube of the hydrofluoric-acid resistant spray chamber to induce turbulence within the outlet tube to at least one of condition or remove large aerosol particles.

20 Claims, 4 Drawing Sheets

METHOD FOR ICPMS INSTRUMENT STABILITY CONTROL WITH STRONG ACID RESISTANT SPRAY CHAMBER

BACKGROUND

Inductively coupled plasma (ICP) mass spectroscopy is an analysis technique commonly used for the determination of trace element concentrations and isotope ratios in liquid samples. ICP mass spectroscopy employs electromagnetically generated partially ionized argon plasma which reaches a temperature of approximately 7000K. When a sample is introduced to the plasma, the high temperature causes sample atoms to become ionized or emit light. Since each chemical element produces a characteristic mass or emission spectrum, measuring said spectra allows the determination of the elemental composition of the original sample.

Sample introduction systems may be employed to introduce the liquid samples into the ICP mass spectroscopy instrumentation (e.g., an inductively coupled plasma mass spectrometer (ICP/ICPMS), an inductively coupled plasma atomic emission spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP mass spectrometry instrumentation. The aerosol is then sorted in a spray chamber to remove the larger aerosol particles. Upon leaving the spray chamber, the aerosol is introduced to the ICPMS or ICP-AES instruments for analysis. Often, the sample introduction is automated to allow a large number of samples to be introduced into the ICP mass spectroscopy instrumentation in an efficient manner.

SUMMARY

Stabilization of an inductively coupled plasma mass spectrometer during analysis of semiconductor-grade chemical samples is described. A method embodiment includes, but is not limited to, transferring an aerosolized sample of a semiconductor-grade chemical into a hydrofluoric-acid resistant spray chamber; passing at least a portion of the aerosolized sample through an outlet tube of the hydrofluoric-acid resistant spray chamber; and introducing an impingement gas into the outlet tube of the hydrofluoric-acid resistant spray chamber to induce turbulence within the outlet tube to at least one of condition or remove large aerosol particles.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items. The drawings are not necessarily to scale.

FIG. 1 is a schematic illustration of a sample analysis system using an impingement gas directed into an outlet tube of a hydrofluoric acid-resistant spray chamber in accordance with example implementations of the present disclosure.

FIG. 2 is a flow diagram illustrating a method of using an impingement gas, such as performed by the example system of FIG. 1, in accordance with an example embodiment of the present disclosure.

FIG. 3 is a perspective view of a hydrofluoric acid-resistant spray chamber, such as the hydrofluoric acid-resistant spray chamber illustrated in FIG. 1, in accordance with an example embodiment of the present disclosure.

FIG. 4 is a cross-section side elevation view 4-4 of the hydrofluoric acid-resistant spray chamber of FIG. 3.

DETAILED DESCRIPTION

While the embodiments of the present application are susceptible to various modifications and alternative forms, specific embodiments thereof have been shown by way of example in the drawings and are herein described in detail. However, it should be understood that the description herein of specific embodiments is not intended to limit the application to the particular embodiment disclosed, on the contrary, the intention is to cover all modifications, equivalents, and alternatives falling within the spirit and scope of the present application as defined by the appended claims. It should be noted that the articles "a," "an," and "the," as used in this specification, include plural referents unless the content clearly dictates otherwise. Additional features and functions are illustrated and discussed below.

Overview

ICP spectroscopy instrumentation, such as inductively coupled plasma mass spectrometers (ICP/ICPMS), can be utilized to analyze the content of trace impurities that may be present in liquid samples. However, the content of the liquid samples can be damaging to certain components of the ICPMS and associated sample preparation systems that prepare a liquid sample for introduction into the ICPMS (e.g., via aerosolization and introduction to a plasma). For example, chemicals used in semiconductor component manufacturing can include ultrapure matrix components, such as concentrated acids (e.g., hydrofluoric acid (HF)), that can damage portions of the ICPMS interface, ion lenses, and the like. The matrix components can form relatively large acid droplets that can damage portions of the ICPMS interface, ion lenses, and the like, which in turn reduces short and long-term stability of the ICPMS instrument.

Accordingly, in one aspect, the present disclosure is directed to systems and methods for stabilizing an ICPMS instrument during analysis of semiconductor-grade chemical samples (e.g., samples having a purity of greater than about 99.0%), with impurities present at a parts per billion threshold and below. In an aspect, a method includes treating an aerosolized sample with an HF-resistant spray chamber and introducing an impingement gas into an outlet tube of the HF-resistant spray chamber to remove or condition larger aerosol particles leaving the HF-resistant spray chamber prior to receipt by the ICPMS instrument. In implementations, a high-velocity impingement gas is utilized to assist in removing sample matrix from analysis of semiconductor-grade chemical samples which can remove aerosol particles in ultrapure samples so that larger acid droplets are not transported to the ICPMS instrument and thus do not damage the ICPMS interface or ion lenses, improving the short and long-term stability of the ICPMS instrument as compared to use of a spray chamber without subsequent gas impingement.

Example Implementations

Figure 1:
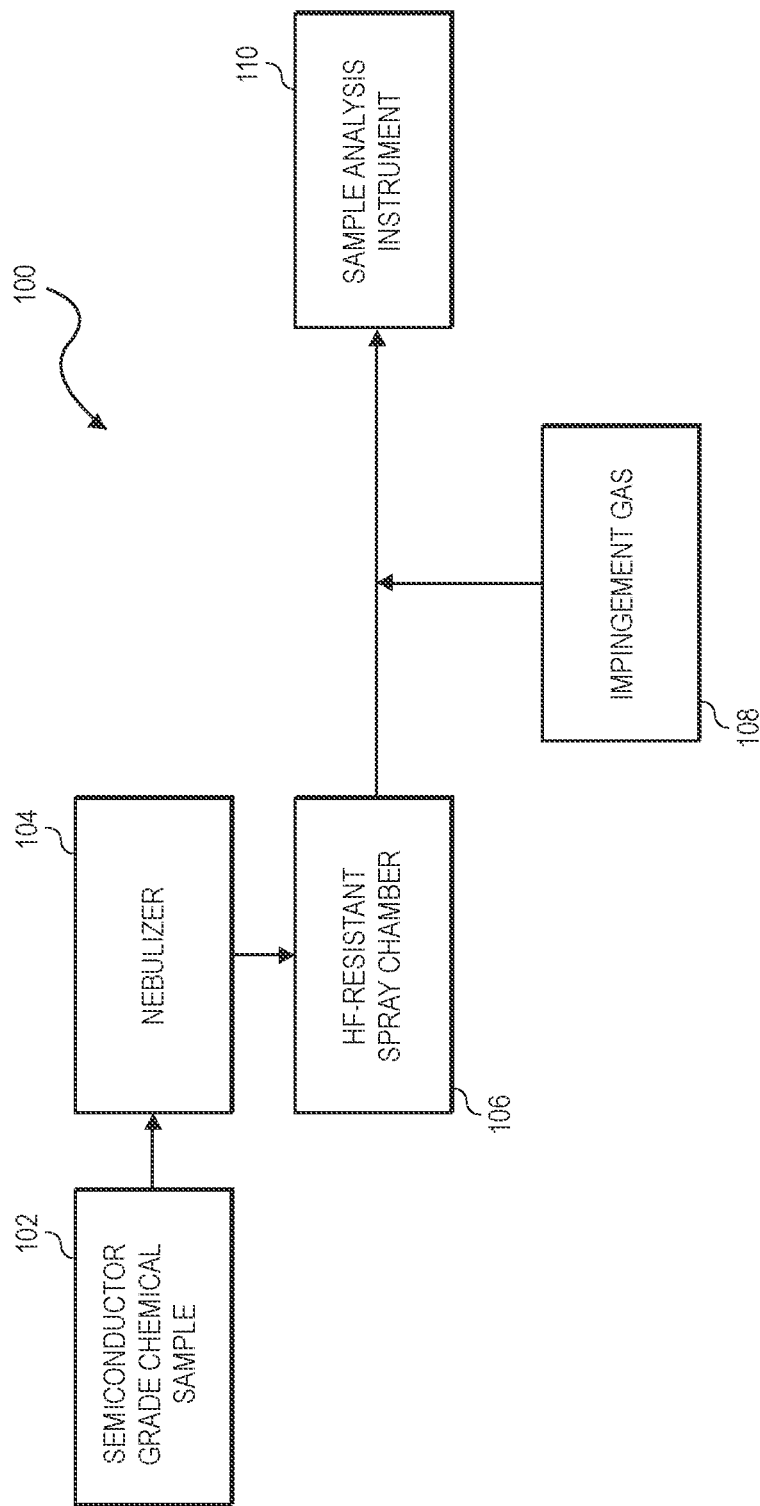

Referring to FIG. 1, a schematic illustration of sample analysis system 100 (hereafter referred to as system 100) is depicted where an impingement gas is directed into an outlet tube of a HF-resistant spray chamber prior to introduction of the sample to a sample analysis instrument.

In embodiments, system 100 includes nebulizer 104, HF-resistant spray chamber 106 (hereafter referred to as chamber 106), and sample analysis instrument 110 fluidly coupled in series such that semiconductor grade chemical sample 102 (hereafter referred to as sample 102) is permitted to pass through nebulizer 104, HF-resistant spray chamber 106, and sample analysis instrument 110 in sequential order. While only nebulizer 104, HF-resistant spray chamber 106, and sample analysis instrument 110 are depicted and described herein regarding FIG. 1, it should be understood that any additional intermediate components fluidly coupled to system 100 may further be contemplated.

In general, sample 102 is an aqueous solution of one or more substances to be analyzed for chemical composition. In embodiments, sample 102 may contain particulates suspended, emulsified, or dissolved within the aqueous solution. For example, sample 102 can be, but is not limited to, a solution containing hydrofluoric acid (or any other semiconductor-grade chemical) along with one or more substances dissolved in the hydrofluoric acid and one or more types of particulates suspended in the hydrofluoric acid.

In general, nebulizer 104 is a device configured to nebulize (also referred to as "aerosolize") a solution such as sample 102. For example, nebulizer 104 can be a jet (e.g., a Venturi spray atomizer), ultrasonic, or mesh nebulizer.

Figure 3:
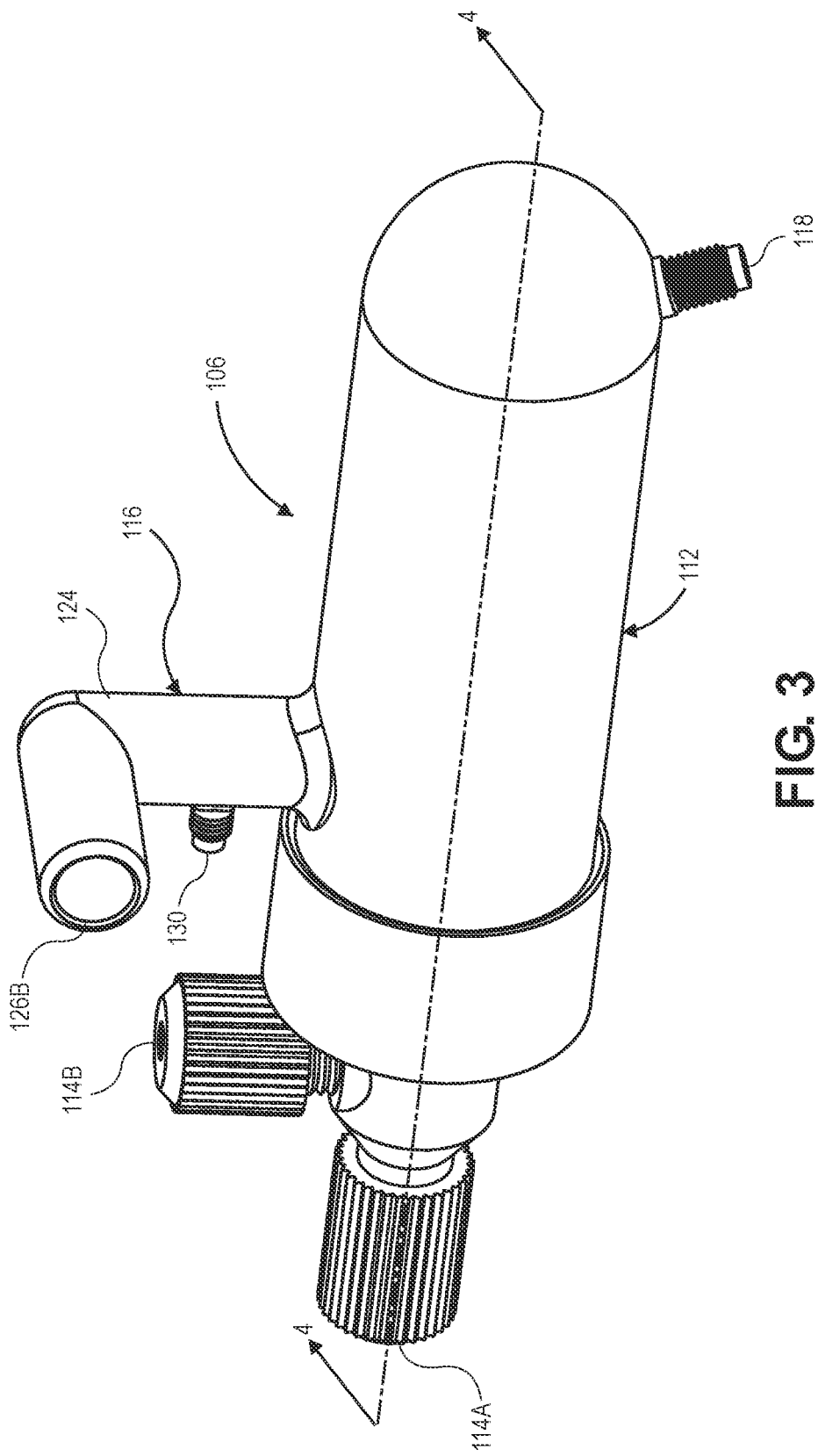
Figure 4:
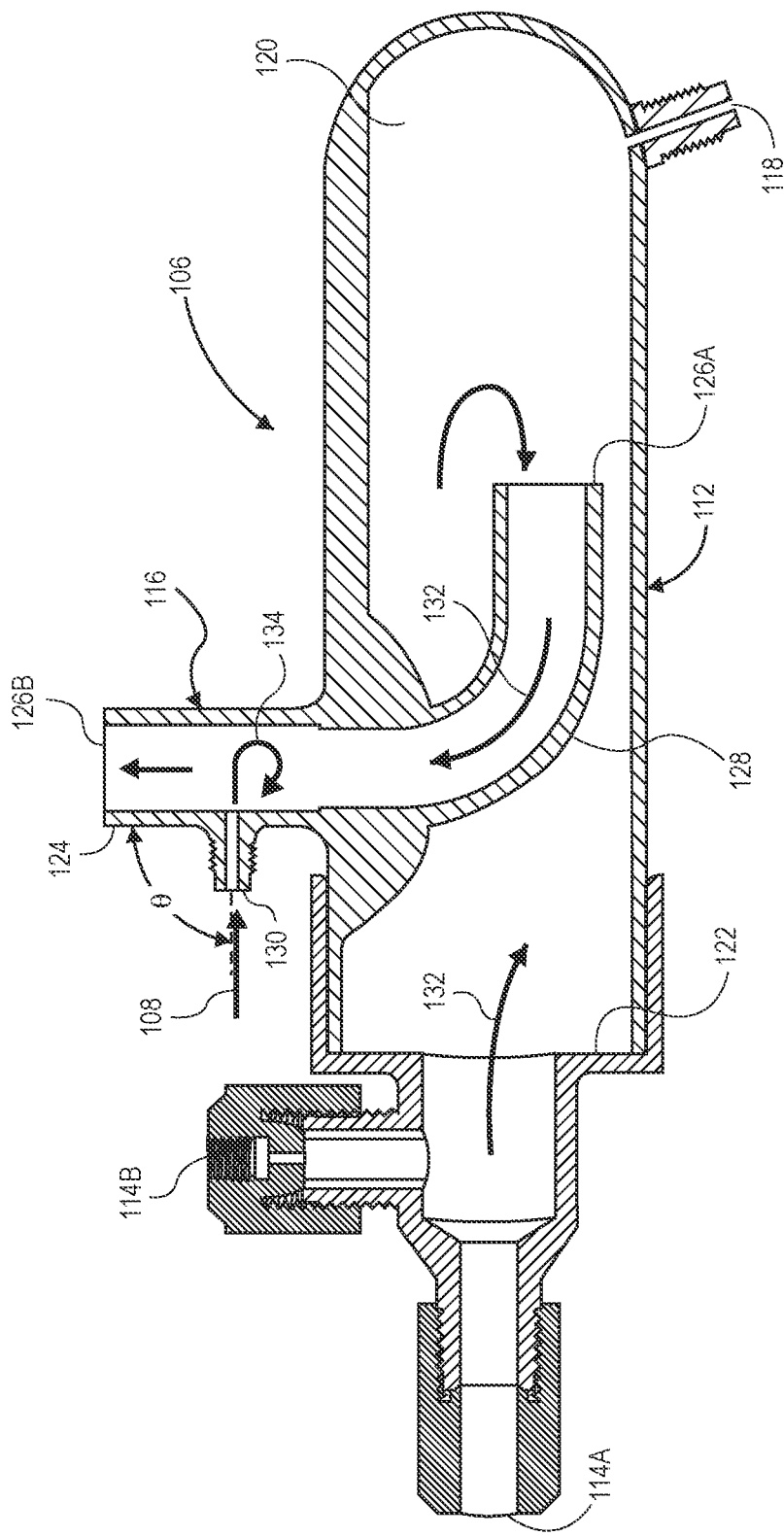

In general, chamber 106 is a chamber that is chemically resistant to sample 102. For example, if sample 102 includes at least hydrofluoric acid, then chamber 106 is composed of a hydrofluoric acid-resistant material. In embodiments, chamber 106 may be composed of at least one of, but is not limited to, perfluoroalkoxy alkane (PFA), polypropylene (PP), quartz, and glass. In embodiments, chamber 106 includes an outlet tube that serves as a conduit for transferring sample 102 from chamber 106 to sample analysis instrument 110 or another intermediary device. In implementations, an impingement gas is introduced through a narrow tube coupled to the outlet tube to induce turbulence within the outlet tube of the HF-resistant spray chamber to remove or condition the larger aerosol particles leaving the HF-resistant spray chamber during analysis of high concentrations of semiconductor-grade chemical samples. Chamber 106 is further described below in reference with FIGS. 3 and 4.

In general, sample analysis instrument 110 may be either, but is not limited to, an ICP, ICPMS, ICP-AES instrument, or any other instrument capable of performing a chemical composition analysis of sample 102.

As depicted in FIG. 1, sample 102 is nebulized by nebulizer 104. The nebulized sample 102 is then transferred to chamber 104 and further transferred to sample analysis instrument 110 wherein impingement gas 108 is introduced to sample 102 as sample 102 transfers from chamber 106 to sample analysis instrument 110. The operational method steps of system 100 are further described below with reference to FIG. 2.

Figure 2:
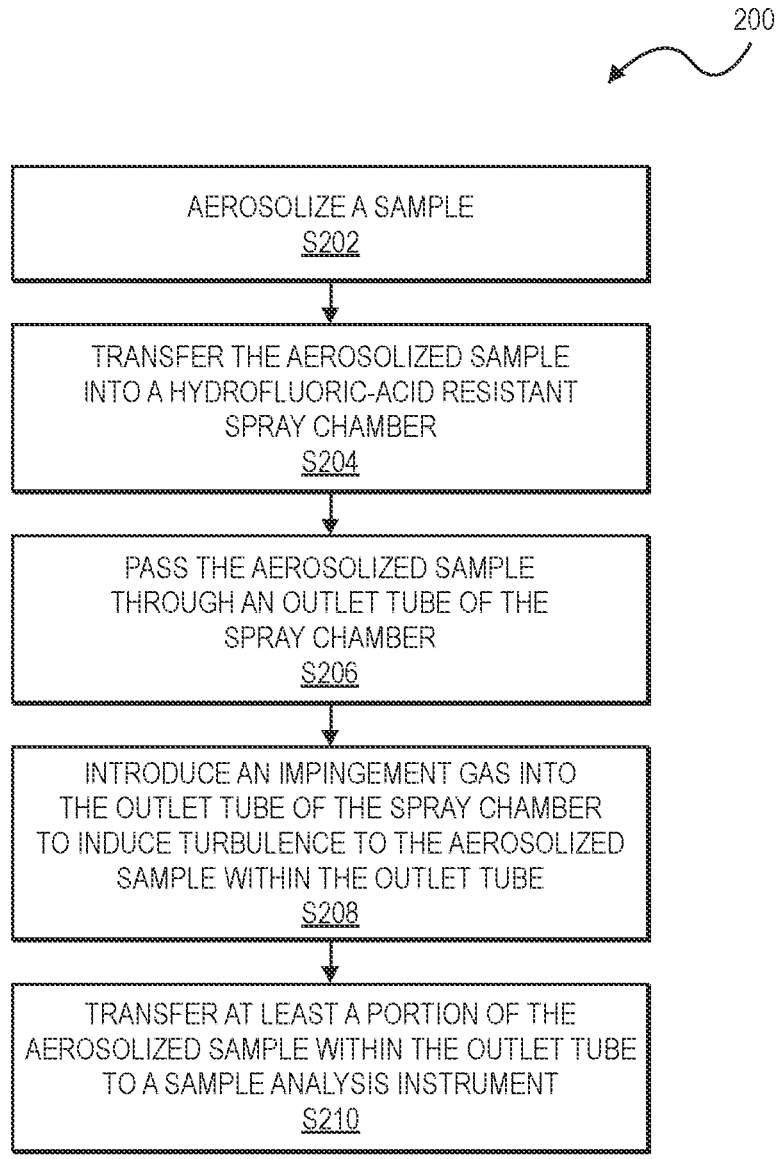

Now referring to FIG. 2, flow diagram 200 illustrates a method of using an impingement gas for stabilization of an inductively coupled plasma mass spectrometer for analysis of semiconductor-grade chemical samples, in accordance with an example embodiment of the present disclosure.

In step S202, nebulizer 104 aerosolizes sample 102.

In step S204, a fluid flow transfers aerosolized sample 102 into chamber 106. In embodiments, a fluid flow is produced by supplying a pressure gradient to system 100 such that nebulizer 104 receives a first fluid pressure and sample analysis instrument 110 receives a second fluid pressure, wherein the first fluid pressure is greater than the second fluid pressure thereby producing a pressure gradient that results in a fluid flow that transfers from nebulizer 104 to sample analysis instrument 110. In embodiments, a pressurized gas is supplied to nebulizer 104 in order to establish the pressure gradient necessary to produce the fluid flow, wherein the fluid flow includes the gas and aerosolized sample 102. In some embodiments, the pressurized gas is chemically inert to sample 102. In some embodiments, the pressurized gas is utilized by nebulizer 104 to aerosolize sample 102 such as a Venturi spray atomizer. As a consequence of the supplied pressure, a resulting pressure gradient and fluid flow transfers aerosolized sample 102 to chamber 106.

In step S206, the fluid flow causes aerosolized sample 102 to pass through an outlet tube of chamber 106, wherein the outlet tube is a conduit for transferring aerosolized sample 102 from chamber 106 to sample analysis instrument 110.

In step S208, impingement gas 108 is introduced to the outlet tube of chamber 106 to induce turbulence to aerosolized sample 102 within the outlet tube to at least one of condition or remove large aerosol particles. In some embodiments, impingement gas 108 may be composed of the same pressurized gas that was supplied to nebulizer 104 in step S204. In some embodiments, impingement gas 108 is a gas different from the pressurized gas that is supplied to nebulizer 104. In embodiments, impingement gas 108 is introduced to the outlet tube at a pressure that is greater than the second fluid pressure located at sample analysis instrument 110. By introducing impingement gas 108 to the outlet tube of chamber 106, the mixture of impingement gas 108 and the fluid flow induces turbulence to the fluid flow, thereby causing relatively heavier/larger aerosolized droplets that are destructive to sample analysis instrument 110 to gravitationally fall back into chamber 106 or adhere to a sidewall of the outlet tube while relatively lighter/smaller aerosolized droplets that are less destructive to sample analysis instrument 110 are permitted to continue flowing with the fluid flow towards sample analysis instrument 110.

In step S210, the fluid flow transfers at least a portion of aerosolized sample 102 within the outlet tube to sample analysis instrument 110.

Now referring to FIGS. 3 and 4, a perspective view and an internal side elevation view of an example chamber 106 is depicted in accordance with an example embodiment of the present disclosure.

In embodiments, chamber 106 includes housing 112, one or more inlet ports (e.g., inlet ports 114A and 114B), outlet tube 116 that passes through housing 112, and drainage port 118, wherein the housing defines cavity 120, and wherein inlet ports 114A-B, outlet tube 116, and drainage port 118 are in fluid communication with cavity 120.

In embodiments, the inlet ports 114A-B are disposed on a first end (i.e., end 122) of housing 112, wherein the one or more of inlet ports 114A-B are configured to receive either aerosolized sample 102, the pressurized gas, or a combination thereof.

In embodiments, drainage port 118 may be selectively open or closed to allow selective drainage of accumulated condensation of the aerosolized sample.

In embodiments, outlet tube 116 is a tubular member having a sidewall and opposing openings 126A-B, wherein opening 126A is located within cavity 120 and opening 126B is located external and distal to housing 112, and wherein openings 126A-B are in fluid communication with each other. In embodiments, outlet tube 116 may have one or more curved portions (e.g., curve 128). In a further embodiment, outlet tube 116 is curved such that opening 126A is oriented in a direction distal to inlet ports 114A-B located on the end 122 of housing 112.

In embodiments, outlet tube 116 includes impingement port 130 located on sidewall 124 wherein impingement port 130 is in fluid communication with cavity 120, wherein impingement port 130 is configured to receive impingement gas 108.

In embodiments, impingement port 130 is configured to direct impingement gas 108 into outlet tube 116 at an angle (e.g., angle θ) with respect to sidewall 124, such that an intersection of impingement gas 108 and fluid flow 132 creates turbulent flow 134 that prevents heavy/large aerosolized sample droplets from exiting opening 126B. In some embodiments, angle θ is orthogonal (i.e., θ=90 degrees) to sidewall 124 of outlet tube 116 such that impingement gas 108 entering outlet tube 116 is orthogonal to fluid flow 132 that passes between openings 126A-B. In some embodiments, angle θ is less than 90 degrees such that impingement gas 108 entering outlet tube 116 is in angular opposition to fluid flow 132 that passes between openings 126A-B.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for stabilization of an inductively coupled plasma mass spectrometer for analysis of semiconductor-grade chemical samples, the method comprising:
    transferring an aerosolized sample of a semiconductor-grade chemical through a first end of a hydrofluoric-acid resistant spray chamber, the hydroflouric-acid resistant spray chamber defining a cavity;
    passing the aerosolized sample through an outlet tube of the hydrofluoric-acid resistant spray chamber, the outlet tube having a portion protruding into the cavity, the portion having an opening oriented in a direction distal from the first end of the spray chamber; and
    introducing an impingement gas into the outlet tube of the hydrofluoric-acid resistant spray chamber to induce turbulence within the outlet tube to at least one of condition or remove large aerosol particles.

2. The method of claim 1, wherein the hydrofluoric-acid resistant spray chamber is formed at least in part from a perfluoroalkoxy alkane.

3. The method of claim 1, wherein the hydrofluoric-acid resistant spray chamber is formed at least in part from a polypropylene.

4. The method of claim 1, wherein the hydrofluoric-acid resistant spray chamber is formed at least in part from a quartz.

5. The method of claim 1, wherein the hydrofluoric-acid resistant spray chamber is formed at least in part from a glass.

6. The method of claim 1, further comprising transferring at least a portion of the aerosolized sample within the outlet tube to a sample analysis instrument.

7. The method of claim 6, wherein the sample analysis instrument is at least one of an inductively coupled plasma (ICP), an inductively coupled plasma mass spectroscopy (ICPMS), and an inductively coupled plasma atomic emission spectrometer (ICP-AES).

8. The method of claim 1, wherein the introduced impingement gas into the outlet tube is directed at an angle with respect to a sidewall of the outlet tube.

9. The method of claim 8, wherein the angle is 90 degrees.

10. The method of claim 8, wherein the angle is less than 90 degrees such that impingement gas is in angular opposition to a fluid flow passing through the outlet tube.

11. The method of claim 1, wherein the semiconductor-grade chemical is a solution containing at least hydrofluoric acid.

12. The method of claim 1, further comprising aerosolizing the sample.

13. The method of claim 12, wherein the sample is aerosolized using at least one of a jet nebulizer, an ultrasonic nebulizer, a mesh nebulizer, and a Venturi spray atomizer.

14. The method of claim 1, wherein the impingement gas is inert to the aerosolized sample.

15. A method for stabilization of an inductively coupled plasma mass spectrometer for analysis of semiconductor-grade chemical samples, the method comprising:
    transferring an aerosolized sample of a semiconductor-grade chemical through a first end of a hydrofluoric-acid resistant spray chamber, the hydrofluoric-acid resistant spray chamber defining a cavity;
    passing the aerosolized sample through an outlet tube of the hydrofluoric-acid resistant spray chamber, the outlet tube having a portion protruding into the cavity, the portion having an opening oriented in a direction distal from the first end of the spray chamber; and
    introducing an impingement gas into the outlet tube of the hydrofluoric-acid resistant spray chamber to induce turbulence within the outlet tube to remove large aerosol particles.

16. A method for stabilization of an inductively coupled plasma mass spectrometer for analysis of semiconductor-grade chemical samples, the method comprising:
    transferring an aerosolized sample of a semiconductor-grade chemical into a hydrofluoric-acid resistant spray chamber, the hydrofluoric-acid resistant spray chamber defining a cavity;
    passing the aerosolized sample through an outlet tube of the hydrofluoric-acid resistant spray chamber; and
    introducing an impingement gas into the outlet tube of the hydrofluoric-acid resistant spray chamber to induce turbulence within the outlet tube to remove large aerosol particles,
    wherein the removed large aerosol particles drain from the outlet tube into the cavity of the hydrofluoric-acid resistant spray chamber.

17. The method of claim 16, wherein the outlet tube includes a portion protruding into the cavity.

18. The method of claim 17, wherein the portion protruding into the cavity is curved.

19. The method of claim 17, wherein the portion of the outlet tube protruding into the cavity includes a opening oriented in a direction distal from a first end of the spray chamber that receives the transferred aerosolized sample.

20. The method of claim 16, wherein the hydrofluoric-acid resistant spray chamber further comprises a drainage port for draining the removed large aerosol particles that drain from the outlet tube into the cavity.

* * * * *